(12) United States Patent
Shah et al.

(10) Patent No.: US 12,436,926 B2
(45) Date of Patent: Oct. 7, 2025

(54) RELATING DATA IN DATA LAKES

(71) Applicant: Adobe Inc., San Jose, CA (US)

(72) Inventors: Raunak Shah, Wagholi (IN); Koyel Mukherjee, Bangalore (IN); Subrata Mitra, Bangalore (IN); Dhruv Joshi, Uttarakhand (IN); Sai Keerthana Karnam, Andhra Pradesh (IN); Shivam Pravin Bhosale, Maharashtra (IN)

(73) Assignee: ADOBE INC., San Jose, CA (US)

( * ) Notice: Subject to any disclaimer, the term of this patent is extended or adjusted under 35 U.S.C. 154(b) by 28 days.

(21) Appl. No.: 18/319,748

(22) Filed: May 18, 2023

(65) Prior Publication Data

US 2024/0386002 A1    Nov. 21, 2024

(51) Int. Cl.
| | |
|---|---|
| *G06F 16/00* | (2019.01) |
| *G06F 16/215* | (2019.01) |
| *G06F 16/28* | (2019.01) |
| *G06F 40/284* | (2020.01) |

(52) U.S. Cl.
CPC .......... *G06F 16/215* (2019.01); *G06F 16/285* (2019.01); *G06F 40/284* (2020.01)

(58) Field of Classification Search
None
See application file for complete search history.

(56) References Cited

U.S. PATENT DOCUMENTS

| | | | |
|---|---|---|---|
| 11,556,566 B1* | 1/2023 | Thunuguntla | G06F 16/285 |
| 2013/0151490 A1* | 6/2013 | Chaturvedi | G06F 16/215 |
| | | | 707/748 |
| 2021/0342319 A1* | 11/2021 | Agarwal | G06F 16/2282 |

OTHER PUBLICATIONS

Bogatu, A. et al., "Dataset Discovery in Data Lakes", School of Computer Science, University of Manchester, Nov. 20, 2020, pp. 1-12, Manchester, UK. 1. https://arxiv.org/pdf/2011.10427.pdf.
Ouellette, P. et al., "RONIN: Data Lake Exploration", http://vldb.org/pvldb/vol14/p2863-nargesian.pdf, PVLDB, pp. 2863-2866, vol. 14, No. 12, 2021.
Zhang, Y. et al., "Finding Related Tables in Data Lakes for Interactive Data Science", In Proceedings of the 2020 ACM SIGMOD International Conference on Management of Data (SIGMOD'20), Jun. 14-19, 2020, 3. https://www.cis.upenn.edu/~zives/research/Finding_Related_Tables_in_Data_Lakes_for_Interactive_Data_Science.pdf.
Bharadwaj, S., "Discovering Related Data at Scale", PVLDB, vol. 14(8), pp. 1392-1400, 2021, 4. http://saikat.guha.cc/pub/pvldb21-din.pdf.

\* cited by examiner

*Primary Examiner* — Anhtai V Tran
(74) *Attorney, Agent, or Firm* — Shook Hardy & Bacon L.L.P.

(57) ABSTRACT

A dataset comprising tables is received. Embeddings are generated for column titles of a table. Based on the embeddings, similar tables are clustered. The tables are organized into smaller clusters based on statistical similarities. Similarity scores are calculated for tables within the same cluster. A relatedness graph is created based on the similarity scores; similar tables are represented by nodes connected by edges. If the similarity score for a pair of tables exceeds a threshold, a table is deleted.

19 Claims, 7 Drawing Sheets

RELATING DATA IN DATA LAKES

BACKGROUND

Organizations store and process huge volumes of data in the course of business operations. Large-scale enterprise data is often stored in "data lakes," which are data repositories that can include structured, unstructured, and/or semi-structured data. Often, data stored in data lakes is not associated with provenance information, making it difficult to identify and remove redundant data.

SUMMARY

Some aspects of the present technology relate to, among other things, systems and methods for identifying and deleting duplicate data in a data lake. In accordance with some aspects, tabular data is clustered based on schema-level features, such as column titles. In some aspects, the tabular data is further clustered based on statistical features, such as distributions of values in columns' cells. Similarity scores are calculated for pairs of tables within a cluster. Based on the similarity scores, duplicate data is detected and corrective action is taken, such as deleting the duplicate data. In some aspects, duplicate data is identified by creating a graph using the similarity scores in order to map relationships between tables. Nodes, which represent tables, are connected with a directed edge if one table is contained within the other table.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
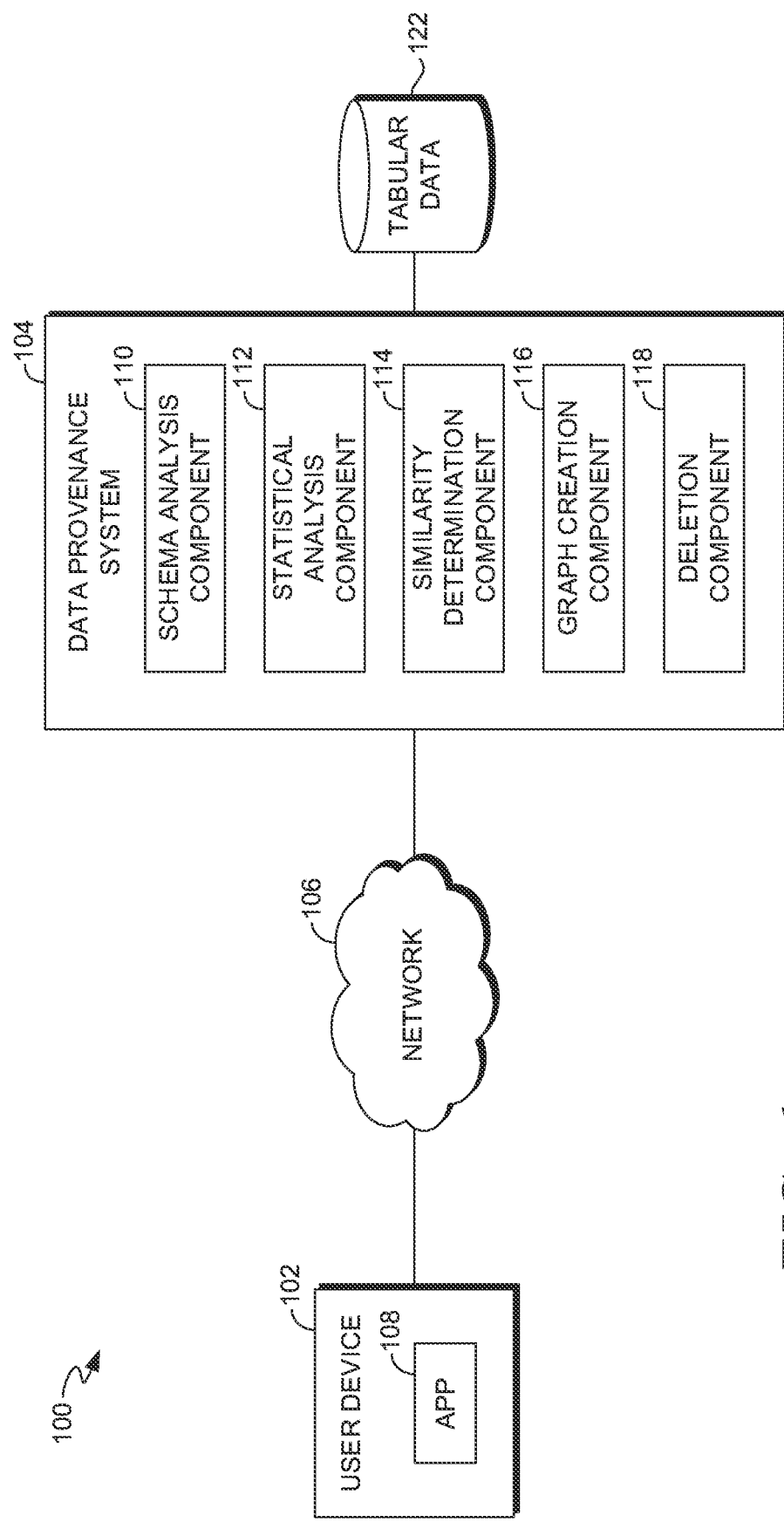
FIG. 1 is a block diagram illustrating an exemplary system in accordance with some implementations of the present disclosure.

Searching and processing data stored in large repositories, such as data lakes, is an onerous task. Data lakes often contain petabytes (or more) of tabular data, and much of the tabular data is typically "scattered" in the sense that no information is available regarding the relatedness between datasets. As a result, navigating (e.g., searching) such a data lake can be a slow, tedious, and inaccurate. These problems are compounded by the large volume of redundant data present in a typical data lake, which can be difficult to identify and weed out due to the aforementioned lack of data relatedness information.

Some existing technologies attempt to identify redundant data at scale. However, many of these technologies are computationally expensive—that is, they require a prohibitive amount of time and/or compute power when applied to a large database. Many existing technologies also fail to consider content-level similarity between tables—i.e., the technologies can make educated guesses as to which tables in a data lake could be related to one another but lack mechanisms for (a) reliably confirming such a relationship and/or (b) determining which table is contained within the other table. The technology described herein, on the other hand, is both computationally efficient and able to consider content-level similarity.

Aspects of the technology described herein provide a data provenance system for identifying and deleting (or navigating) redundant data at scale. In contrast to conventional approaches, the data provenance system identifies redundant data in a manner that is both computationally efficient and accurate.

At a high level, the data provenance system performs several steps, over the course of which it progressively narrows the space of possible duplicates for each table, obtaining more granular/detailed information regarding similarities between tables at each step. Initially, the system clusters tables according to schema-level characteristics. In this step, the system considers characteristics such as character frequency in column titles. The system also generates embeddings for words in column titles using a natural language processing (NLP) model. A clustering algorithm clusters the vectors/embeddings; the resulting clusters represent groups of tables that are potentially (at least partial) duplicates of one another.

In some aspects, the data provenance system further narrows the range of possible duplicates by forming smaller clusters within the existing clusters—this time by considering statistical (as opposed to schema-level) similarities between tables in each cluster. Specifically, the system vectorizes information regarding the distribution of values within cells of each column and combines those vectors into a matrix. Then, clusters are formed based on the matrices for each table.

In order to determine with a higher degree of certainty whether clustered tables are duplicates of one another, the data provenance system calculates a similarity score for each pair of tables within a cluster. The similarity score considers a variety of features, such as cardinality, value distribution, and syntactic features. The system creates a graph including nodes that represent tables in the cluster, and if a similarity score for a pair of tables exceeds a threshold, the system creates an edge between the corresponding nodes. In aspects, the system performs various additional steps in order to determine which of a pair of highly similar tables is contained within the other. Once such a determination is made, the table contained within the larger table is deleted.

Aspects of the technology described herein improve the functioning of a computer in a number of ways. For example, aspects of the technology described herein significantly decrease the computational costs associated with identifying duplicate data. In turn, the existence of duplicate data in data lakes (and other databases) significantly slows and increases the compute costs of various processing tasks—such as search query execution, data summarization, and so on. Accordingly, aspects of the technology described herein decrease computing resource consumption and increase the speed and efficiency with which queries (and other processing tasks) can be performed. In a similar vein, aspects of the technology described herein reduce data storage costs by removing redundant data.

Example Data Provenance System

With reference now to the drawings, FIG. 1 is a block diagram illustrating an exemplary system 100 for determining data provenance information in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a data provenance system 104. Each of the user device 102 and data provenance system 104 shown in FIG. 1 can comprise one or more computer devices, such as the computing device 700 of FIG. 7, discussed below. As shown in FIG. 1, the user device 102 and the data provenance system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the data provenance system 104 can be provided by multiple server devices collectively providing the functionality of the data provenance system 104 as described herein. Additionally, other components not shown can also be included within the network environment.

The user device 102 can be a client device on the client side of operating environment 100, while the data provenance system 104 can be on the server side of operating environment 100. The data provenance system 104 can comprise server-side software designed to work in conjunction with client-side software on the user device 102 so as to implement any combination of the features and functionalities discussed in the present disclosure. For instance, the user device 102 can include an application 108 for interacting with the data provenance system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the data provenance system 104 remain as separate entities. While the operating environment 100 illustrates a configuration in a networked environment with a separate user device and material selection system, it should be understood that other configurations can be employed in which components are combined. For instance, in some configurations, a user device can also provide capabilities of the technology described herein.

The user device 102 can comprise any type of computing device capable of use by a user. For example, in one aspect, the user device can be the type of computing device 700 described in relation to FIG. 7 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the data provenance system 104 via the user device 102.

At a high level, the data provenance system 104 constructs a relatedness graph for tabular data by analyzing schema-level and/or statistical similarities between tables. Once duplicate data is identified, the data provenance system 104 can delete or remove the duplicate data.

As shown in FIG. 1, the data provenance system 104 includes a schema analysis component 110, a statistical analysis component 112, a similarity determination component 114, a graph creation component 116, and a deletion component 118. The components of the data provenance system 104 can be in addition to other components that provide further additional functions beyond the features described herein. The data provenance system 104 can be implemented using one or more server devices, one or more platforms with corresponding application programming interfaces, cloud infrastructure, and the like. While the data provenance system 104 is shown separate from the user device 102 in the configuration of FIG. 1, it should be understood that in other configurations, some or all of the functions of the data provenance system 104 can be provided on the user device 102.

In one aspect, the functions performed by components of the data provenance system 104 are associated with one or more applications, services, or routines. In particular, such applications, services, or routines can operate on one or more user devices or servers, be distributed across one or more user devices and servers, or be implemented in the cloud. Moreover, in some aspects, these components of the data provenance system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, although functionality is described herein with regards to specific components shown in example system 100, it is contemplated that in some aspects, functionality of these components can be shared or distributed across other components.

Clustering

Figure 2:
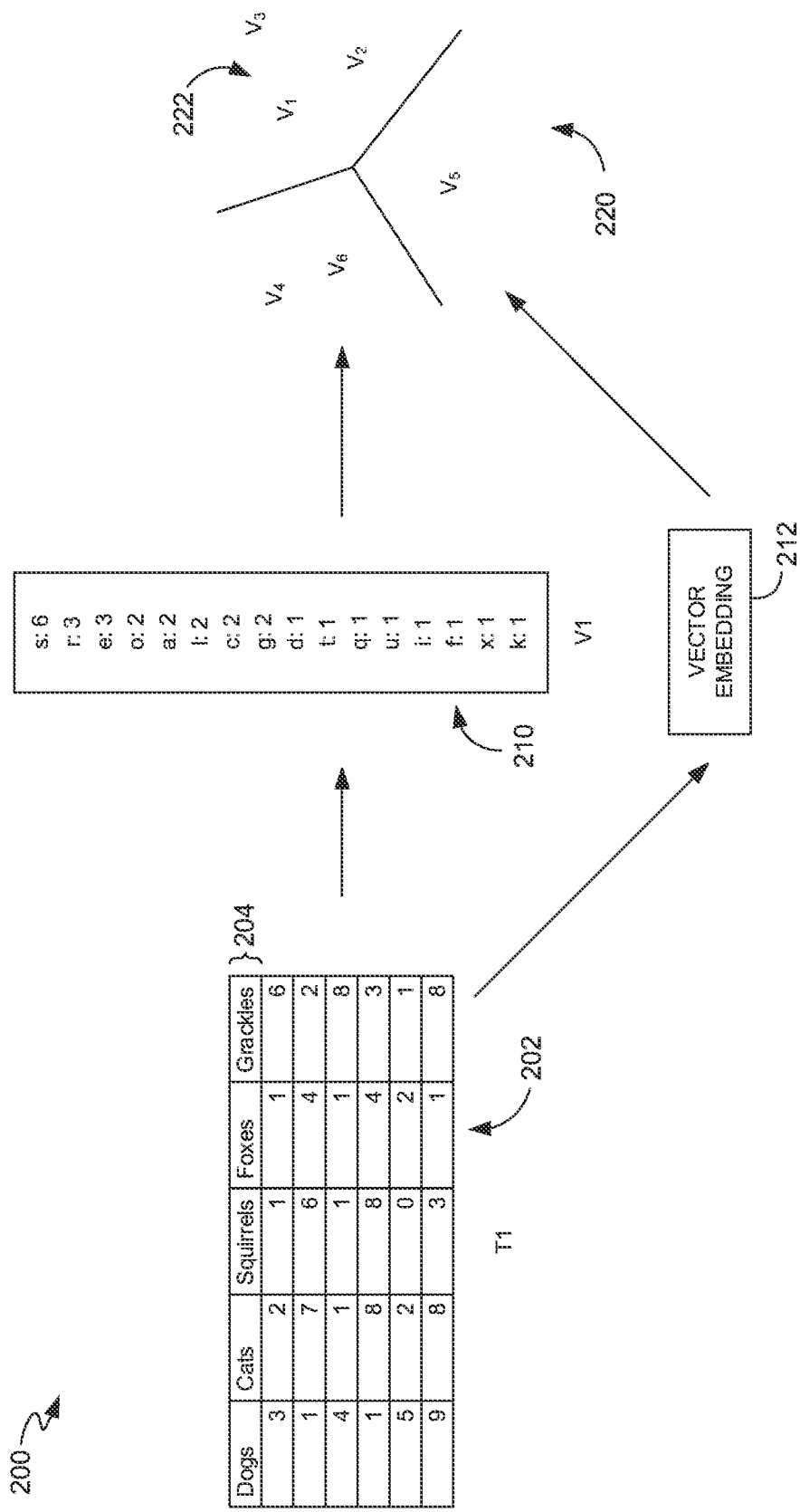
FIG. 2 is an exemplary process for clustering vectors based on schema-level characteristics in accordance with some implementations of the present disclosure.

The schema analysis component 110 clusters tabular data based on schema-level characteristics of the tabular data. FIG. 2 illustrates an exemplary process 200 by which the schema analysis component 110 can cluster tabular data. In aspects, the schema analysis component 110 receives tabular data. The tabular data can be received from a database 122 (shown in FIG. 1)—e.g., over the network 106. The database 122 can correspond to a data lake.

The tabular data comprises one or more tables, such as table 202 shown in FIG. 2. Each table contains at least one row and at least one column. The tables can comprise column titles 204, which are textual and/or numerical descriptions of data or values contained in cells of corresponding columns. Additionally, although shown in FIG. 2 as comprising only numerical data, tables can comprise textual data and/or numerical data. Further, one or more cells can comprise no data (e.g., contain a value of "null").

The schema analysis component 110 can create one or both of a character frequency vector 210 and a vector embedding 212 in order to cluster tables of the tabular data. At a high level, the character frequency vector 210 contains information regarding the frequencies with which textual characters appear in tables' column titles 204, and the vector embedding 212 contains information regarding words that appear in tables' column titles 204.

In order to create the character frequency vector 210, the schema analysis component 110 determines a frequency of each character that appears in the column titles 204. In order to enhance the information value of the character frequency vector 210, the schema analysis component 110 can weight or normalize the character frequencies based on the frequency with which they appear in the relevant language (e.g., English). For example, "e" is the most common character in English, so if the column titles 204 are in English, the schema analysis component 110 can decrease the weight or frequency associated with the character "e" relative to other, less common characters. The resulting character frequencies (whether normalized or not) can be compiled into the character frequency vector 210.

In order to create the vector embedding 212, the schema analysis component 110 utilizes one or more natural language processing (NLP) techniques in order to analyze the column titles 204. Initially, the schema analysis component 110 can perform any combination of (or none of) the following steps in any order in order to, for example, increase the information value of the vector embedding 212. First, the schema analysis component 110 can extract words and/or sentences from the column titles 204. Second, the schema analysis component 110 can filter out stop words (e.g., "a" and "the"). Third, the schema analysis component 110 can tokenize the words and/or sentences.

Further, in aspects, the schema analysis component 110 utilizes one or more NLP techniques or models to generate embeddings for the tokens (or the non-tokenized words or sentences, as the case may be). For example, the schema analysis component 110 can provide the tokens as inputs into a Global Vectors (GloVe) model, which can generate one or more vector embeddings (e.g., one vector for each token). The schema analysis component 110 can average the embeddings, producing a multi-dimensional vector embedding 212 for the column titles 204 of the table 202. The vector embedding 212 can be concatenated with the character frequency vector 210 into a single vector.

In aspects, the schema analysis component 110 repeats the process described above in regard to the table 202 (e.g., can create a character frequency vector, vector embedding, and/or concatenated vector) for each table of the tabular data. The result is a plurality of vector embeddings containing information regarding respective tables of the tabular data received by the schema analysis component.

In aspects, the schema analysis component 110 clusters the plurality of vector embeddings into a plurality of clusters 220, such as the cluster 222 shown in FIG. 2. This step can be performed using any suitable unsupervised learning method, such as k-means clustering. Because each vector of a cluster (e.g., the cluster 222) corresponds to a respective table of the tabular data, the act of clustering the vectors effectively groups tables into clusters of potential duplicates.

In some aspects, the statistical analysis component 112 (shown in FIG. 1) forms clusters of tables (or, more precisely, clusters of vectors that correspond to respective tables) within the clusters formed by the schema analysis component 110. Whereas the schema analysis component 110 clusters tables based at least in part on column titles, the statistical analysis component 112 clusters tables based on numerical and/or textual values contained within columns/cells. However, it is contemplated that this step is not necessarily included in all embodiments. For example, in some embodiments, the clusters formed by the schema analysis component 110 can be sufficiently small (e.g., in terms of the total number of tables within a cluster and/or an average number of tables per cluster) such that duplicate tables can be identified within clusters in a time-efficient manner.

Figure 3:
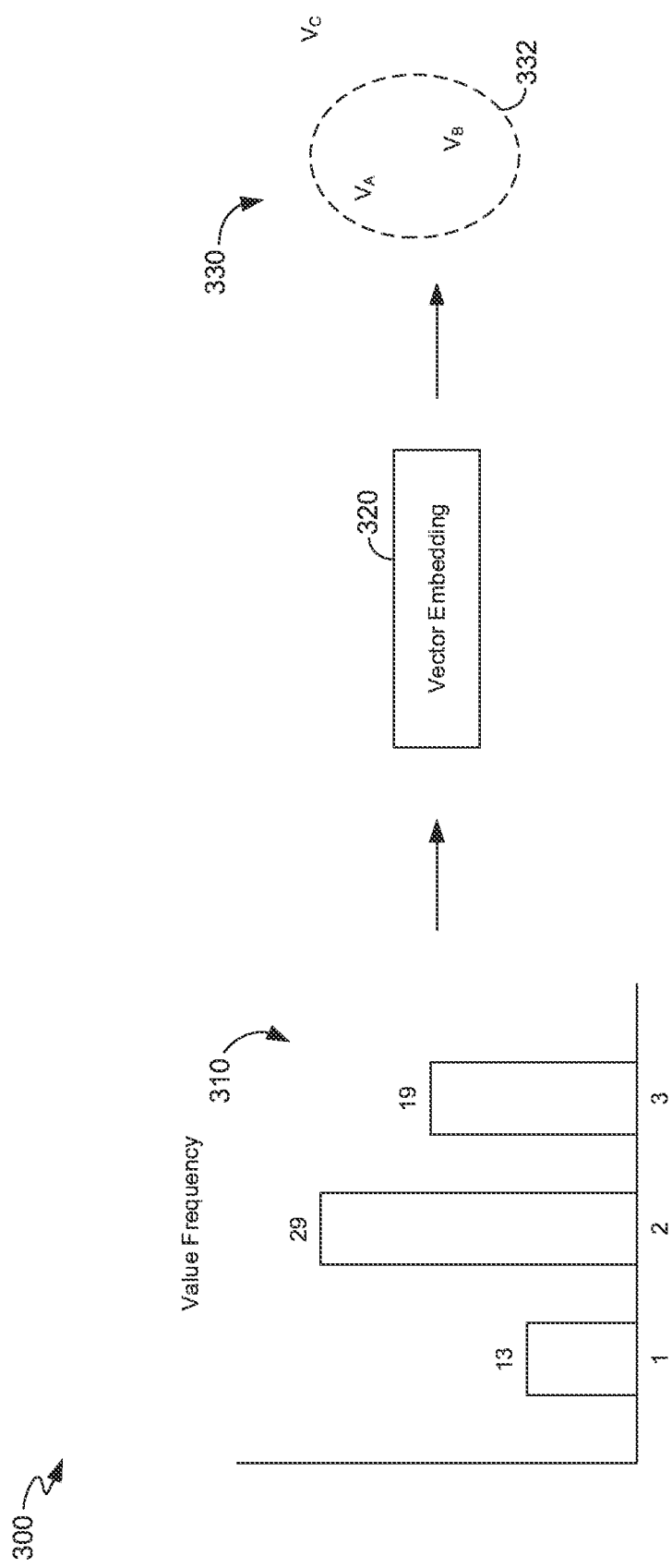
FIG. 3 is an exemplary process for clustering vectors based on statistical similarity in accordance with some implementations of the present disclosure.

FIG. 3 illustrates an exemplary process 300 by which the statistical analysis component 112 can cluster tables (e.g., tables in a cluster formed by the schema analysis component 110). Initially, for each column of a table, the statistical analysis component 112 determines a frequency distribution of column values. If the column values (e.g., values contained in cells of the column) are numerical, the statistical analysis component 112 can determine the distribution by counting the instances of each unique value that appears in the column. In the example shown in FIG. 3, the statistical analysis component 112 has determined that, for the column in question, there are 13 instances of the value "1," 29 instances of the value "2," and 19 instances of the value "3." In some embodiments, such as when the number of unique values (or the range of values) in the column is large, the statistical analysis component 112 can determine the distribution by counting the instances of values that fall into numerical ranges (e.g., [1, 7), [7, 13), [13, 19), and so on), forming a histogram that represents the value distribution of the column. Regardless of whether the column values are counted individually or in ranges, the resulting value distribution information can be organized into a vector embedding 320 for the column. In the example shown in FIG. 3, for instance, the vector embedding 320 could be {13, 29, 19}, reflecting the number of instances of each unique value in the column.

If, on the other hand, the column values are textual (as opposed to numerical), the statistical analysis component 112 can utilize one or more NLP techniques or models to generate embeddings for the textual column values. For example, the statistical analysis component 112 can provide the textual column values as inputs into a GloVe model, which can generate one or more vector embeddings (e.g., one vector for each textual column value). The statistical analysis component 112 can average the embeddings, producing a multi-dimensional vector embedding for the column.

Once a vector embedding has been created for each column of the table, the vector embeddings for the columns of the table can be concatenated into a matrix. Each vector can form a respective column of the matrix. Thus, in some aspects, the matrix comprises a plurality of embeddings representative of respective columns of a table. The process described above can be repeated for each table being analyzed (e.g., each table in a cluster, such as the cluster 222 shown in FIG. 2) such that the statistical analysis component 112 creates respective matrices for each table.

Further, in order to enhance the clustering algorithm's ability to accurately cluster the matrices, the statistical analysis component 112 can add one or more placeholder columns to matrices. For example, if a first table comprises a first column entitled "Dogs" and a second column entitled "Cats," and a second table comprises a "Dogs" column but not a "Cats" column, the statistical analysis component 112 can add a placeholder column to the matrix corresponding to the second table. The placeholder column can, for example, contain the zero vector (or no value) in each row or cell of the placeholder column—e.g., to indicate that the second table contains no data related to the first table's "Cats" column.

In aspects, the statistical analysis component 112 clusters the matrices into one or more clusters 330, such as the cluster 332 shown in FIG. 3. This step can be performed using any suitable unsupervised learning method, such as k-means clustering. In embodiments in which the statistical analysis component 112 clusters tables within clusters formed by the schema analysis component 110, this process can further refine the set of tables that are potential duplicates of one another. In other words, the clustering process performed by the statistical analysis component 112 can form a second, smaller cluster (e.g., containing fewer tables) from a first cluster formed by the schema analysis component 110.

Similarity Determination and Graph Creation

At this point, vectors and/or matrices corresponding to tables of the tabular data have been organized into clusters by the schema analysis component 110 and/or the statistical analysis component 112. However, some tables clustered with one another may not, in fact, be at least partial duplicates of one another. In order to weed out such false positives, in some embodiments, the similarity determination component 114 (shown in FIG. 1) calculates a similarity score—e.g., for each pair of tables within each cluster. At a high level, the similarity score can be or comprise a quantitative measure of the similarity between a pair of tables.

In embodiments, the similarity determination component 114 calculates the similarity score for a pair of tables in a cluster based on a similarity (e.g., a cosine similarity) of one or more of the following types of meta-features. First, the similarity score can be based on cardinality meta-features, including cardinalities of the tables (e.g., the number of cells in the tables), quantities of null values (e.g., empty cells) in the tables, and/or numbers of unique values in the tables. Second, the similarity score can be based on value distribution meta-features, including average values of the tables, minimum values of the tables, maximum values of the tables, and/or standard deviations of values of the tables. Third, the similarity score can be based on syntactic meta-features, including total numbers of words in the tables and/or total numbers of characters in the tables.

Figure 4:
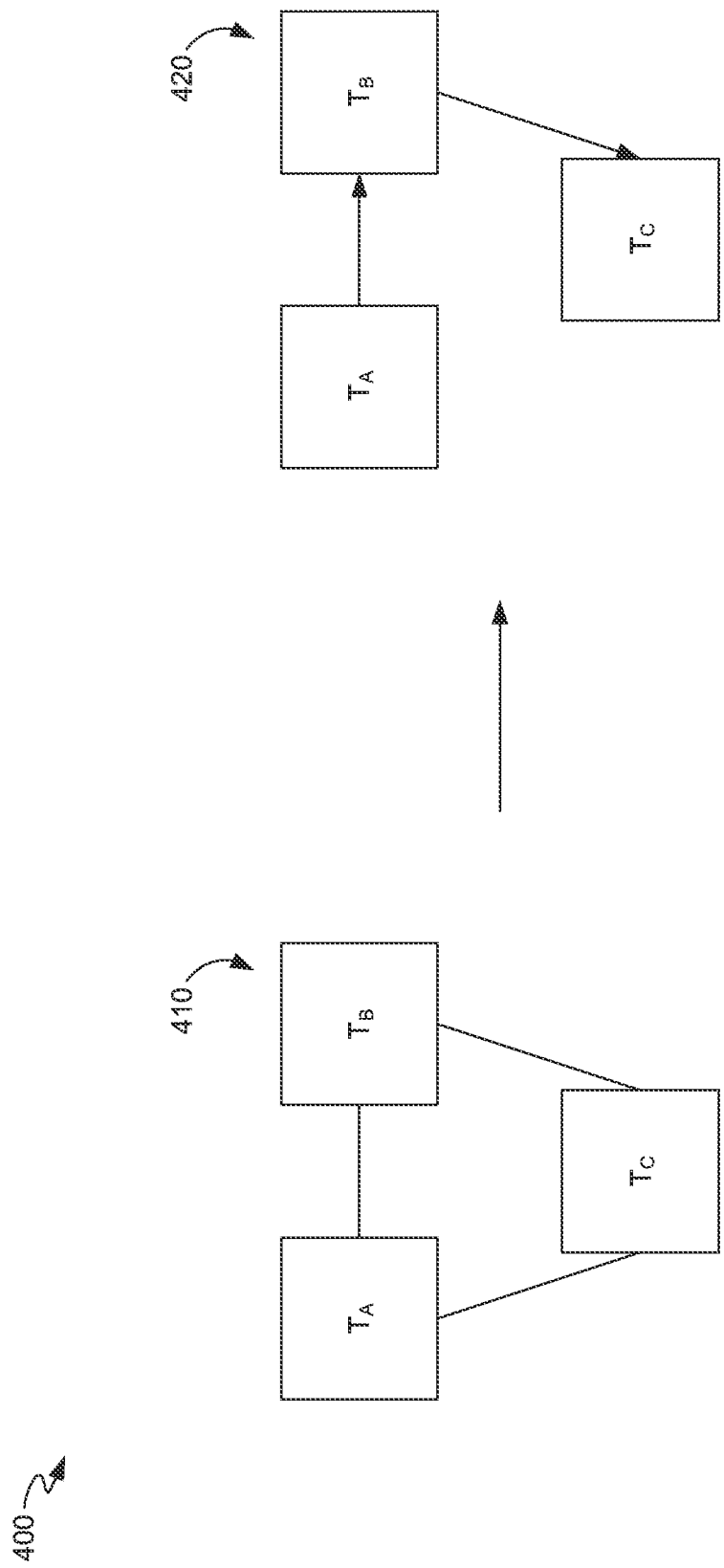
FIG. 4 is an exemplary process for forming a relatedness graph in accordance with some implementations of the present disclosure.

FIG. 4 illustrates an exemplary process 400 by which the graph creation component 116 (shown in FIG. 1) can create a relatedness graph 410 and/or a directed relatedness graph 420. The relatedness graph(s) comprise nodes, each of which represents a table, and edges, each of which connects a pair of nodes and signifies that the corresponding tables could be at least partial duplicates of one another. It will be appreciated that although the graph creation component 116 is described herein as creating one or more "graphs," in some embodiments, the graph creation component does not create a literal graph (e.g., comprising visual representations of nodes and edges), but rather, creates an adjacency matrix and/or another representation of relationships between tables.

At a high level, the graph creation component 116 can identify tables as potential duplicates based on the cluster(s) formed by the schema analysis component 110 and/or the statistical analysis component 112, and/or based on the similarity score(s) calculated by the similarity determination component 114. In some aspects, the graph creation component 116 determines whether a similarity score for a pair of tables is above a threshold (e.g., a numerical threshold). If the similarity score is above the threshold, the graph creation component 116 can form an edge (e.g., an undirected edge) between the pair of tables. The graph creation component 116 can also weight the edge based on the similarity score. This process (i.e., creating edges for pairs of tables with similarity scores above the threshold) can be repeated for each pair of tables for which a similarity score was calculated by the similarity determination component 114. In the same or other embodiments, the graph creation component 116 can form edges between all pairs of tables/nodes within a cluster (e.g., create a complete graph) and weight the edges based on the corresponding similarity scores.

In some aspects, the graph creation component 116 creates a directed graph 420. Whereas the undirected relatedness graph 410 indicates which tables are related to each other (e.g., contain duplicate data), the directed graph 420 indicates which tables can be derived from (e.g., are contained within) other tables in the cluster.

In order to determine whether a first table is contained within a second table in a manner that is not prohibitively computationally expensive, the graph creation component 116 can perform any combination of the following checks (in any order): whether a total number of rows in the first table is less than or equal to the number of rows in the second table; whether a total number of columns in the first table is less than or equal to a number of columns in the second table; whether column titles of the first table are a subset of column titles of the second table; and whether a timestamp column of the first table is contained within a timestamp column of the second table.

If the graph creation component 116 determines based on the check(s) that the first table is contained within the second table, the graph creation component 116 adds a directed edge from the second table to the first table. For instance, in the example directed graph 420 shown in FIG. 4, a first directed edge extends from $T_A$ to $T_B$, and a second directed edge extends from $T_B$ to $T_C$. This indicates that $T_C$ is contained within $T_B$, which is contained within $T_A$. The graph creation component 116 can repeat this process (e.g., creating directed edges) for each cluster.

In aspects, the deletion component 118 (shown in FIG. 1) performs one or more corrective steps based on the graph creation component's 116 determination that a first table is contained within a second table. For example, the deletion component 118 can delete the first table based on the determination that the first table is contained within the second table (and so on for each pair of tables connected by a directed edge, for example). As another example, the deletion component 118 can flag the first table for future deletion and/or perform more detailed (e.g., computationally intensive) checks to confirm that the first table is, in fact, contained within the second table.

The deletion component 118 can repeat this process for each cluster—e.g., deleting tables that are contained within other tables, as indicated by the corresponding directed edges. Such deletion of redundant data can free up storage space and/or significantly speed up downstream processing tasks, for example.

In some aspects, the data provenance system 104 performs other steps instead of (or in addition to) deleting redundant data. For example, the data provenance system 104 can, in response to a search query for which a table has bene identified, recommend (e.g., as additional search results) one or more other tables in a same cluster as the table (and/or tables that have a similarity score above a threshold with respect to the table). As another example, in response to a request to import, create, or otherwise ingest tabular data, the data provenance system 104 can be utilized to provide an indication that one or more datasets (e.g., that are stored in the database 122) could be redundant (or partially redundant) with the data to be imported or created. As such, in some aspects, the data provenance system 104 prevents the creation of redundant data.

Example Methods

Figure 5:
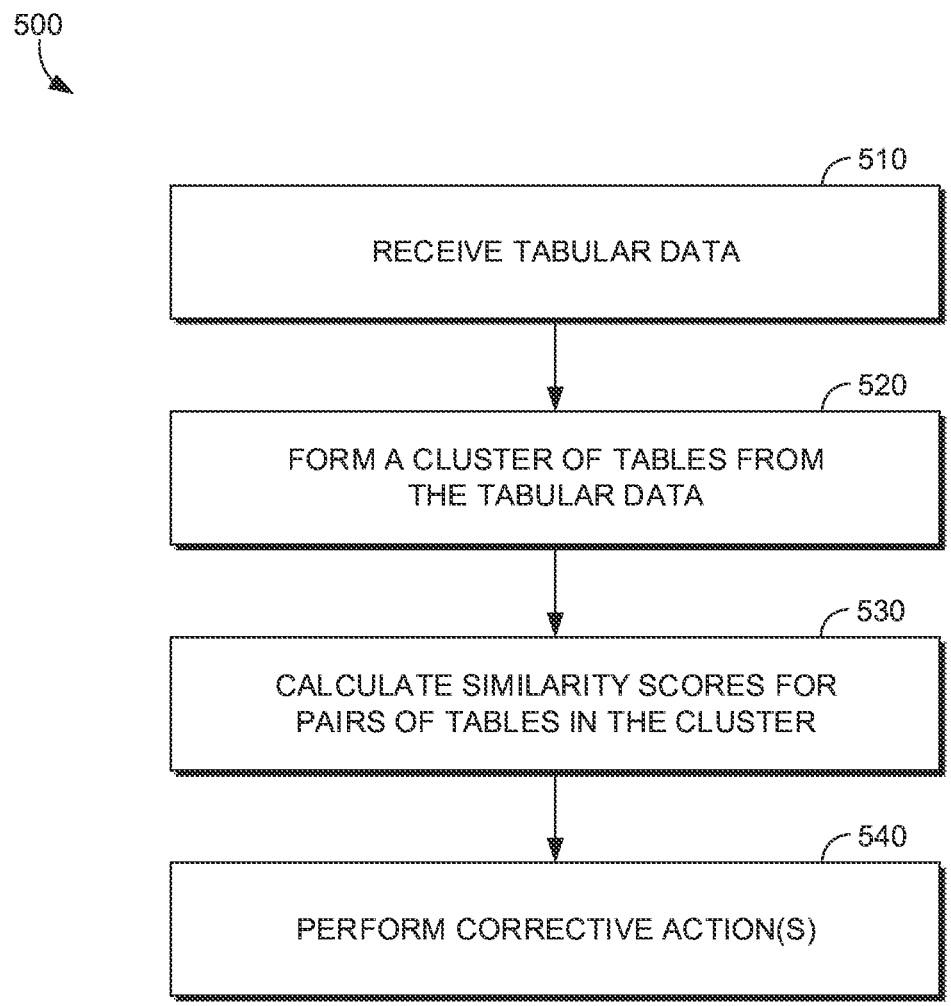
FIGS. 5-6 are flow diagrams showing a methods of correcting redundancies in data in accordance with some implementations of the present disclosure.

With reference now to FIG. 5, a flow diagram is provided that illustrates a method 500 for identifying and/or removing redundant tabular data. The method 500 can be performed, for instance, by the data provenance system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few examples.

As shown at block 510, tabular data is received. The tabular data can be received over a network. The tabular data can comprise one or more tables.

At block 520, a cluster of tables is formed from the tabular data. In some aspects, the tables are clustered based on schema-level relatedness—e.g., in accordance with any of the aspects described herein with respect to the schema analysis component 110. In other aspects, the tables are clustered based on statistical relatedness—e.g., in accordance with any of the aspects described herein with respect to the statistical relatedness component 112. In still other aspects, the tables are clustered based both on schema-level relatedness and statistical relatedness. For example, the tables can first be clustered based on schema-level relatedness and then subsequently clustered within those clusters according to statistical relatedness.

At block 530, similarity scores are calculated for pairs of tables in the cluster. The similarity scores can be determined by calculating a cosine similarity of a pair of tables' cardinality meta-features, value distribution meta-features, and/or syntactic meta-features, for example.

At block 540, one or more corrective action(s) is/are performed. In aspects, tables that are contained within one or more other tables—e.g., based on the similarity score(s) exceeding a threshold—are deleted.

Figure 6:
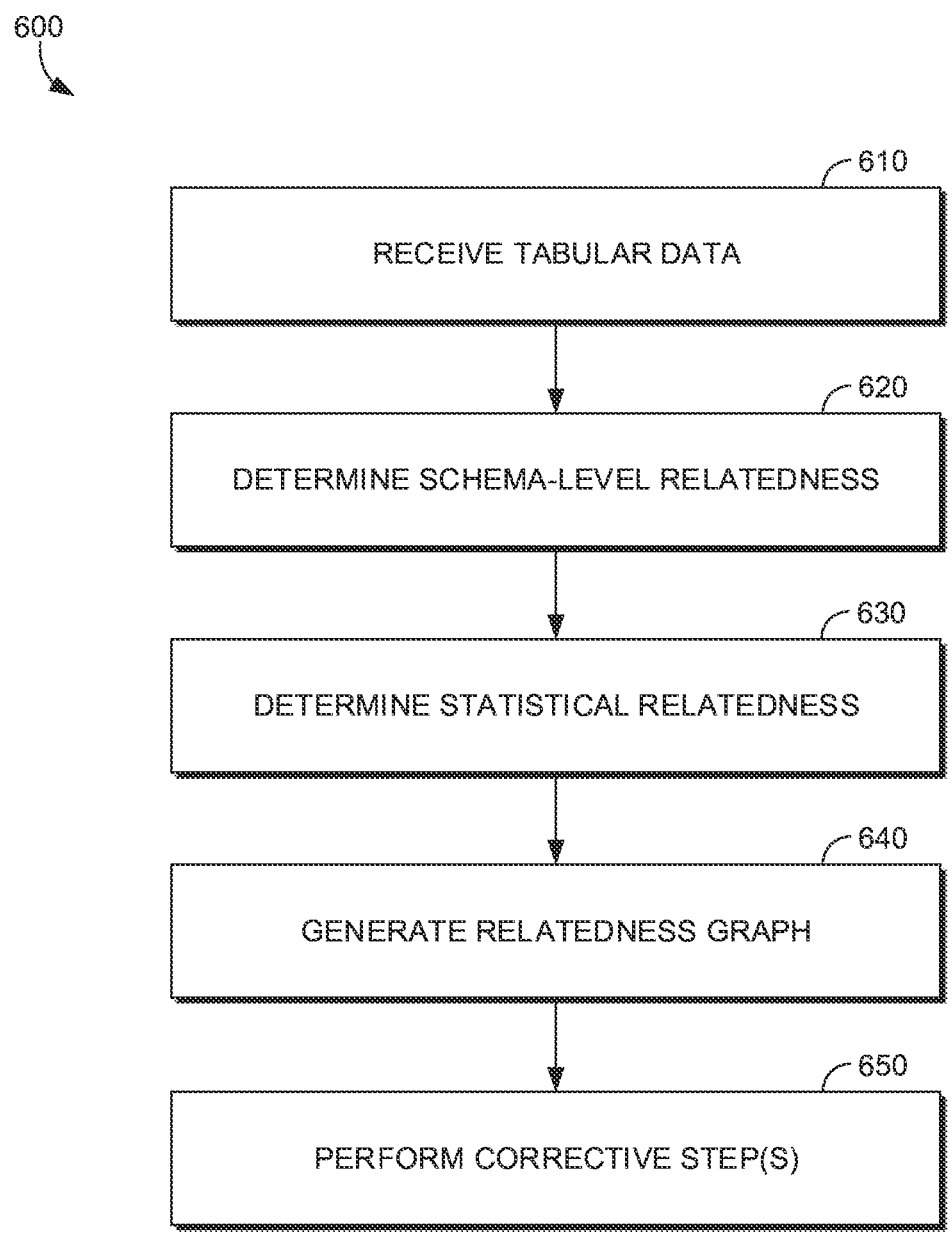

With reference now to FIG. 6, a flow diagram is provided that illustrates a method 600 for identifying and/or removing redundant tabular data. The method 600 can be performed, for instance, by the data provenance system 104 of FIG. 1.

As shown at block 610, tabular data is received. The tabular data can be received over a network. The tabular data can comprise one or more tables.

At block 620, schema-level relatedness is determined. In aspects, tables' column titles are analyzed—e.g., by determining the frequencies with which characters (e.g., letters and/or numbers) appear in the column titles. A character frequency vector can be created for each table of the tabular data based on the character frequencies for the respective table. In aspects, the column titles are also analyzed by generating embeddings for the column titles using a NLP model, such as a GloVe model. In some aspects, the embeddings are averaged and concatenated with the corresponding character frequency vectors such that one concatenated vector is created per table of the tabular data. The concatenated vectors can be clustered—e.g., using a k-means clustering algorithm.

At block 630, statistical relatedness is determined. A matrix is created for each table; columns of the matrix correspond to columns of the table. For columns of the table that contain numerical values, a distribution (e.g., a histogram) of values is determined. This distribution information is organized into a vector. For columns of the table that contain textual data, embeddings can be created for textual values in the column (e.g., the column's most common textual values). Those embeddings can be averaged into a single embedding for the column. This process can be repeated for each column of the table, and the resulting vectors can be combined into the matrix. This process can be repeated for each table of the tabular data such that a matrix is created for each table of the tabular data. The tables can be clustered based on the matrices—e.g., using k-means clustering. The tables can be clustered within the clusters created at block 620—e.g., to create smaller clusters. However, it is contemplated that, in some embodiments, the operations corresponding to block 630 are not performed—e.g., if the clusters formed at block 620 are sufficiently small.

At block 640, a relatedness graph is created. The relatedness graph can be based on similarity scores for pairs of tables within a same cluster. The similarity scores can be determined by calculating a cosine similarity of a pair of tables' cardinality meta-features, value distribution meta-features, and/or syntactic meta-features, for example. In some aspects, all tables in the cluster are connected via edges, which are weighted based on the corresponding similarity scores. In other embodiments, a pair of tables is only connected by an edge if the similarity score for the pair of tables exceeds a threshold. Further, a directed graph can be created. For pairs of tables connected by edges in the relatedness graph, checks can be performed in order to determine which of the two tables (if any) is contained within the other. If a first table is contained within a second table, a directed edge can be added between the first table and the second table (e.g., from the second table to the first table). This process can be repeated for each pair of tables connected by edges in the relatedness graph.

At block 650, one or more corrective steps is performed. In aspects, tables that are contained within one or more other tables are deleted. For example, tables that have one or more incoming directed edges in the directed graph can be deleted.

Exemplary Operating Environment

Figure 7:
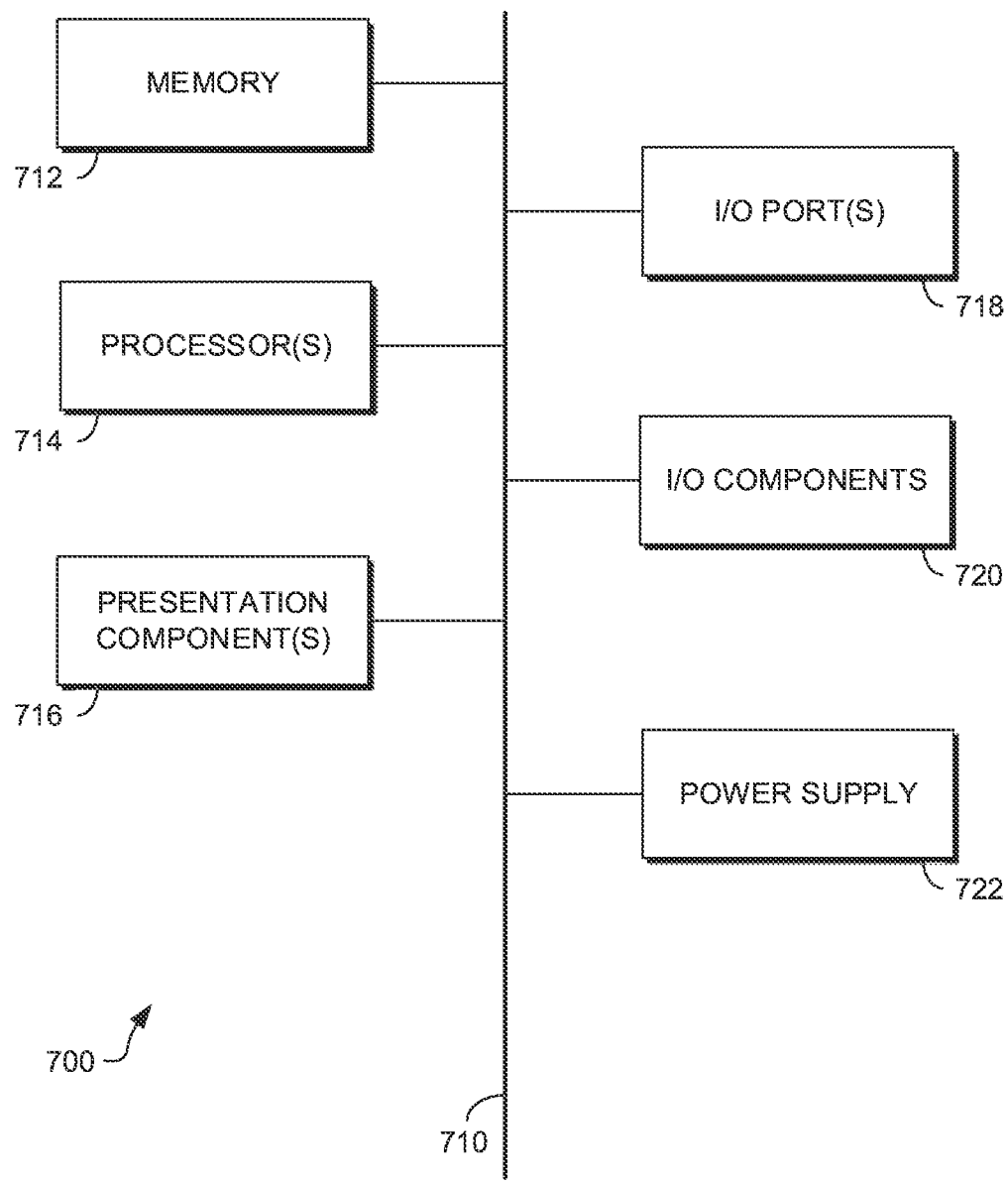
FIG. 7 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring to FIG. 7, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 717, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

We claim:

1. A computer-implemented method comprising:
receiving a dataset comprising a plurality of tables;
generating embeddings for column titles of a first table of the plurality of tables;
based on the embeddings, forming a first cluster comprising the first table and a second table of the plurality of tables;
for each table in the first cluster, generating a vector for each column based on a frequency distribution of cell values for each column and forming a matrix from the vectors;
forming, within the first cluster, a second cluster based on a comparison of at least a portion of the matrices, wherein the second cluster includes the first table and the second table;
based on the second cluster including the first table and the second table, calculating a similarity score for the first table and the second table; and
based on the similarity score exceeding a threshold, deleting the second table.

2. The computer-implemented method of claim 1, wherein the similarity score is calculated based on computing a cosine similarity of one or more selected from the following: a first cardinality of the first table and a second cardinality of the second table; a first quantity of null values in the first table and a second quantity of null values in the second table; and a first average value of the first table and a second average value of the second table.

3. The computer-implemented method of claim 1, wherein the forming the first cluster is further based on embeddings for column titles of the second table.

4. The computer-implemented method of claim 1, wherein the deleting the second table is based on a determination that the second table is contained within the first table.

5. The computer-implemented method of claim 4, wherein the determination that the second table is contained within the first table is based on:
determining that a total number of rows in the second table is less than or equal to a total number of rows in the first table;
determining that a total number of columns in the second table is less than or equal to a total number of columns in the first table; and
determining that a timestamp column of the second table is contained within a timestamp column of the first table.

6. The computer-implemented method of claim 1, the method further comprising:
tokenizing the column titles; and
generating the embeddings from the tokenized column titles.

7. One or more computer storage media storing computer-useable instructions that, when used by a computing device, cause the computing device to perform operations, the operations comprising:
receiving a dataset comprising a plurality of tables;

forming a first cluster comprising a first table and a second table of the plurality of tables based on column titles of the plurality of tables;

forming a second cluster within the first cluster based on a comparison of matrices formed for tables in the first cluster using vectors generated from frequency distributions of cell values for columns of the tables of the first cluster, wherein the second cluster comprises the first table and the second table;

based on the first table and the second table being in the second cluster, calculating a similarity score for the first table and the second table; and based on the similarity score exceeding a threshold, determining that the second table is at least a partial duplicate of the first table.

8. The media of claim 7, wherein the forming the first cluster is further based on embeddings generated for the column titles of the plurality of tables.

9. The media of claim 8, the method further comprising:
tokenizing the column titles; and
generating the embeddings from the tokenized column titles.

10. The media of claim 7, wherein the similarity score is calculated based on computing a cosine similarity of one or more selected from the following: a first cardinality of the first table and a second cardinality of the second table; a first quantity of null values in the first table and a second quantity of null values in the second table; and a first average value of the first table and a second average value of the second table.

11. The media of claim 7, wherein the operations further comprise:
deleting the second table based on the determining that the second table is at least a partial duplicate of the first table.

12. The media of claim 11, wherein the deleting the second table is based on a determination that the second table is contained within the first table.

13. The media of claim 12, wherein the determination that the second table is contained within the first table is based on:
determining that a total number of rows in the second table is less than or equal to a total number of rows in the first table;
determining that a total number of columns in the second table is less than or equal to a total number of columns in the first table; and
determining that a timestamp column of the second table is contained within a timestamp column of the first table.

14. A computer system comprising:
one or more processors; and
one or more computer storage media storing computer-useable instructions that, when used by the one or more processors, causes the one or more processors to perform operations comprising:
receiving a dataset comprising a plurality of tables, including a first table and a second table;
forming a first cluster based on a comparison of matrices formed for tables of the plurality of tables using vectors generated from frequency distributions of cell values for columns of the tables of the plurality of tables, wherein the first cluster comprises the first table and the second table;
based on the first table and the second table being in the first cluster, calculating a similarity score for the first table and the second table;
based on the similarity score exceeding a threshold, determining that the second table is at least a partial duplicate of the first table.

15. The system of claim 14, wherein the operations further comprise:
prior to forming the first cluster, forming a second cluster comprising the first table and the second table based on column titles of the plurality of tables, wherein each table of the first cluster is present in the second cluster.

16. The system of claim 15, wherein the second cluster is formed based on embeddings generated for the column titles of the plurality of tables.

17. The system of claim 14, wherein the similarity score is calculated based on computing a cosine similarity of one or more selected from the following: a first cardinality of the first table and a second cardinality of the second table; a first quantity of null values in the first table and a second quantity of null values in the second table; and a first average value of the first table and a second average value of the second table.

18. The system of claim 14, wherein the operations further comprise:
deleting the second table based on the determining that the second table is at least a partial duplicate of the first table.

19. The system of claim 18, wherein the deleting the second table is based on a determination that the second table is contained within the first table, and wherein the operations further comprise:
determining that a total number of rows in the second table is less than or equal to a total number of rows in the first table;
determining that a total number of columns in the second table is less than or equal to a total number of columns in the first table; and
determining that a timestamp column of the second table is contained within a timestamp column of the first table.

* * * * *